Patented Dec. 10, 1935

2,023,495

UNITED STATES PATENT OFFICE 2,023,495

PREPARED RESIN

Charles A. Thomas, Dayton, Ohio, assignor, by mesne assignments, to Monsanto Petroleum Chemicals, Inc., Dayton, Ohio, a corporation of Delaware No Drawing. Application November 10, 1930, Serial No. 494,692

7 Claims. (Cl. 260—2)

This invention relates to the manufacture of artificial or prepared resins, and coating materials produced from such prepared resins.

One of the principal objects of this invention is to provide such a prepared resin having unusual and valuable reactive and combining power, and a method of preparing such a resin.

Another object is to prepare such a prepared resin, by reacting a synthetic resin with other materials to produce a resultant resin reaction product having superior characteristics.

Another object is to provide a protective coating material made from such prepared resin, which coating material produces a very flexible and substantially water-proof film.

Other objects and advantages of the invention will be apparent from the following description and appended claims.

In the practicing of this invention a synthetic resin is first produced by reacting a diolefine such as isoprene, with an olefine such as amylene; or by reacting a diolefine, such as isoprene, with a substituted benzene such as an alkyl benzene, such as toluene, or the xylenes and their homologues; or by reacting a mixture of unsaturated hydrocarbons such as are present in certain fractions of cracked distillate. These materials are reacted or polymerized in the presence of a suitable catalyst, such as aluminum chloride. In producing this resin various diolefines may be used with various olefines or with various substituted benzenes, in the manner described in the co-pending applications of Charles A. Thomas and Carroll A. Hochwalt, Serial No. 294,491, Patent No. 1,836,629, filed July 21, 1928, and of Charles A. Thomas, Serial No. 461,807, filed June 17, 1930, and of Charles A. Thomas, Serial No. 482,157, Patent No. 1,947,626 filed September 15, 1930.

A satisfactory synthetic resin has also been produced by reacting together a diolefine, an olefine, and a substituted benzene, or a mixture of unsaturated hydrocarbons containing these three reactive substances, such as the fraction of cracked distillate distilled between 30° C. and 160° C. Thus a satisfactory resin has been produced by reacting together isoprene, amylene and toluene in the proportions of approximately 50 parts of isoprene and 50 parts of amylene to 38 parts of toluene. A somewhat similar resin, having substantially the same acid number, was produced by reacting together isoprene, amylene, and xylene in substantially equal proportions by weight of each of the named reactive constituents.

The examples given above are illustrative of proportions of the reactive materials which may be used. However, the proportions of such reactive materials used in carrying out this process may be varied widely depending on the particular qualities desired in the resin to be produced. Resins are produced by reacting mixtures of the above described materials in substantially all proportions. Thus, molecular proportions of a diolefine and an olefine, or a diolefine and a substituted benzene, or a diolefine and an olefine and a substituted benzene, have been found to produce resins very satisfactory for many uses. The proportions best adapted to produce the properties desired in the resulting resin, and at the same time produce a yield of resin large enough for economical production, can readily be determined by experiment. It has been found that an increased proportion of olefine produces a softer resin, and where a hard resin is desired it is not desirable to have the amount of olefine exceed the amount of diolefine. Consequently, where a soft resin is desired, the olefine content should be increased. In reacting a diolefine with a substituted benzene, it has been found that the iodine number of the resulting resin appears to increase or decrease in direct ratio to the proportion of diolefine used. Thus an increase in the proportion of substituted benzene in reacting materials consisting of a mixture of diolefine and substituted benzene, appears to produce a resin having a smaller iodine number.

It has also been found that when a substituted benzene has been used as one of the reacting materials, the resulting unsaturated hydrocarbon resin is particularly reactive and combines readily with other materials to produce reaction products having distinctive and valuable properties. However, when a proportion of substituted benzene in excess of molecular proportions is used, such excess appears to serve as a solvent rather than to enter into the reaction. In such case, a resin is produced which is lighter in color than when the substituted benzene is used in molecular proportions or less.

Various olefines and diolefines or mixtures of these may be used in preparing this resin, for example, such diolefines as hexadiene, isoprene, and butadiene, and dimethyl buta-diene, may be mentioned as representative members of the group. As representative olefines which react with diolefines compounds in the manner described, may be mentioned the amylenes, including symmetrical and unsymmetrical methyl ethyl ethylene, trimethyl ethyl ethylene and normal propyl ethylene, or pentene-2. Other unsaturated hydrocarbons having one double bond, or olefines, will react in this manner.

Various substituted benzenes may also be used with various diolefines or with mixtures of diolefines and olefines. Satisfactory resins have been obtained by this process using substituted benzenes such as toluene, or the xylenes and their homologues. Other substituted benzenes may be used, such as cymene, ethyl benzene, di-ethyl benzene, normal-propyl benzene and iso-propyl benzene, tetra-methyl benzene, secondary butyl benzene, tertiary butyl benzene, amyl benzene, tertiary amyl benzene, hexa-methyl benzene, hexa-ethyl benzene, or styrene (vinyl benzene).

Inasmuch as the resins described above are produced from unsaturated hydrocarbons, they are termed herein for purposes of description "unsaturated hydrocarbon resins"; but it is to be understood that such designation does not refer to the chemical composition of the resinous products themselves but rather to the starting materials from which the resins are prepared.

Whatever reactive materials or mixtures of reactive materials are reacted to produce the unsaturated hydrocarbon resin used in carrying out this invention, the same method may be followed. As an example of the method of producing an unsaturated hydrocarbon resin which has been effectively used in carrying out this invention the following procedure is described, using a mixture of unsaturated hydrocarbons included in the fraction of cracked distillate distilled between 30° C. and 160° C.

It is to be understood that the term "unsaturated hydrocarbons" as used herein, refers to hydrocabron compounds which unite with other compounds, such for example, as the halogens, to form addition products without splitting off a new compound. Unsaturated hydrocarbon compounds are capable of giving the Baeyer test for unsaturation. (Text book of Organic Chemistry, Holleman, 6th Edition, page 131.)

This mixture is placed within a suitable container or polymerizing vessel, and an activating compound such as powdered anhydrous aluminum chloride ($AlCl_3$) is added while the mixture in the vessel is being agitated. The aluminum chloride is preferably pulverized to give better contact, and is added in small quantities at a time while the contents of the polymerizing vessel are being agitated. For example, presuming that 25 gallons of a mixture of active ingredients are to be treated within the polymerizing vessel, aluminum chloride may be added in quantities of approximately 6 to 8 ounces at a time. With the addition of the first batch of aluminum chloride, there is a rather active chemical reaction with a resultant rise in temperature. It is desirable to control the temperature of the reaction inasmuch as this has a bearing upon the character of the resultant resin, particularly the hardness thereof. The reaction is preferably carried out above 20° C., as then the resultant resin is very materially harder and the yield is somewhat greater than when the reaction is carried out below 20° C. However, it is desirable where an atmospheric polymerizing vessel is used that the temperature should not be permitted to rise much above 40° C. Otherwise the polymerizing vessel should be kept under pressure to prevent undue volatilization and loss of resin. Polymerization at higher temperatures, such as above 65° C., requires a special pressure vessel. Very satisfactory results are secured when the temperature is controlled beaween 25° and 35° C., this being readily accomplished by introducing the aluminum chloride in small amounts with proper agitation to prevent local overheating and by cooling the reaction mass by a suitable cooling jacket. This polymerizing reaction is preferably carried out in the absence of water. Water present during the reaction hydrolyzes the catalyst to form an acid which in turn affects the reaction, resulting in a darker and quite different resin product.

Additional batches of aluminum chloride are added from time to time as may be done without unduly increasing the temperature of the reaction mass, and this is repeated with continuous agitation until no further temperature rise results. The amount of aluminum chloride used is also controlled in accordance with the materials being treated, as this is found to have a bearing upon the yield. It is found that the larger the volume of active ingredients being treated at any one time, the lesser the amount of catalyst needed per unit weight of active ingredients for optimum results. Thus when treating the above mixture in twenty-five gallon batches, very satisfactory results are secured by the addition of about three pounds of catalyst, this being equivalent to approximately 1.4 grams of catalyst for 100 cc. of active ingredients. Where smaller batches are being treated, such for example as a batch of 100 cc. an increased proportion of catalyst is used to give maximum yield, generally about 3.5 to 3.7 grams of aluminum chloride per 100 cc. of active ingredients giving optimum results. The quantity of catalyst needed for best results can be readily determined by tests for the particular ingredients being treated, so that this amount can be used in regular plant production. In any event, it is desirable that the amount of catalyst used be not increased materially over four grams per 100 cc. of active ingredients, as the character of the resultant resin may be deleteriously influenced.

In addition to aluminum chloride, other compounds which hydrolyze in water giving an acid reaction will function satisfactorily to cause the conversion of the active ingredients into resin,— for example chlorides of iron, boron, zinc, antimony, indium, titanium and tin. The time of the treatment is also found to have a bearing upon the resultant resin, particularly the color. The reaction may proceed as much as 12 hours, but it is found desirable not to leave the catalyst in contact with the materials for a period of time much in excess of this, as the resin may be darkened. The reaction is preferably completed in less time, such as about 6 to 8 hours, this giving optimum results.

It has been found that the end of the polymerization reaction is indicated when the mixture has reached a constant density. This point is conveniently determined by making density determinations on samples of the polymerized mixture at half hour periods when the polymerization reaction is nearing completion. When the density is found to be constant at three successive periods, the polymerization reaction will usually be found to be complete. The reaction time for plant use may be readily determined in this manner on a trial run for specified materials and amounts.

The resulting reaction product is a viscous mass dark in color. This viscous material is then neutralized to terminate or kill the polymerizing reaction. Various water soluble alkalies may be used for this neutralizing, but preferably ammonia is employed as the excess of this material can be removed by distillation and has no injurious effects on the resulting resin. The neutralizing threatment is preferably carried out in the presence of an organic hydroxy compound, which is effective to supply hydroxyl radicals for the decomposition and precipitation of the aluminum chloride or other activating agent present. An alcohol, such as ethyl alcohol, functions very satisfactorily for this purpose. Thus a mixture of about 40% by volume of ammonium hydroxide containing 28% $NH_3$ by weight and 60% by volume of 95% ethyl alcohol gives good results. With the quantities specified above, slightly more than 3 gallons of this mixture is used, the amount theoretically required being approximately one half of 3.2 gallons of the above mixture. The mass is agitated constantly during the neutralization and a granular precipitate of the activating agent is produced which is readily removed by filtration—for example where aluminum chloride is used a precipitate of a aluminum hydroxide is formed. The neutralization is accompanied by a color change, the reacting mass changing from a black or dark red to a yellowish red or yellow as the neutralization is completed. The neutralizing reaction is completed in about a half hour.

After the neutralizing reaction is completed the contents of the neutralizing vessel are preferably heated by means of a suitable temperature controlling jacket to a temperature of about 60° C.–80° C., or until the distillate comes over clear. That is, the distillation is continued till no more water comes over. For the amounts specified, this operation is continued 1–2 hours. During this heating substantially all the excess ammonia and alcohol is liberated and is allowed to pass off to a suitable condenser for the recovery of the distillate. From the distillate, ammonia and alcohol may be separated and recovered. In this process it is found desirable that substantially all of the water and $NH_3$ be removed to prevent precipitation of the resin and consequent clogging of the filter.

When the neutralization is carried out in the presence of water as described above, the subsequent distillation is more difficult and water may be occluded in the resin resulting in an opaque product. Where a clear resin is essential, or for more convenient plant operation, it may be desirable to carry out the neutralizing operation in the absence of water. In such case an anhydrous alcohol or other organic hydroxy liquid saturated with dry $NH_3$ gas can be used for the neutralization with very satisfactory results. When no aqueous solutions have been used, the above distillation can be carried out in less time than specified above.

When reacting the mixture of unsaturated hydrocarbons in this manner, it is found that two products are formed, one being an amorphous resin compound readily soluble in benzol, and another being a gelatinous compound insoluble in such solvent. This insoluble compound is carried down in the precipitate. In order to insure complete solution of the resinous product and to facilitate the filtering operation, an organic solvent which is immiscible with water, such as benzol, is added to the neutralized mass after free water and ammonia have been distilled off. In the distillation process approximately one half the volume of the original reaction mixture may be distilled off. The amount of solvent added is then approximately equal to the volume distilled off; that is, for the quantities specified about 12 gallons of benzol are added to the neutralized and distilled mass.

The neutralized mass mixed with benzol is then passed through a suitable filter, such as a conventional filter press, where the undissolved materials including the precipitated activating agent are removed from the liquid. The filtered sludge removed in the filter press is preferably treated to recover aluminum oxide ($Al_2O_3$) and ammonium chloride ($NH_4Cl$) as by products. In place of the filter press a suitable type of centrifuge may be used if desired.

The clear filtrate containing the resin in solution is allowed to pass into a distillation vessel provided with a suitable heating jacket for the introduction of a heating medium such as steam or oil. The material within the distillation vessel is now heated to distill off the more volatile constituents, including benzol and any remaining alcohol, which may pass off to a suitable condenser as to be recovered for repeated use in the process. Distillation is continued until a thermometer in the distillation line rises to approximately 100° C., at which time substantially all of the benzol and any remaining small amounts of alcohol and water, will have been driven off of the resulting resin which is left in the distillation vessel as a semi-fluid or pasty mass, termed herein a "soft resin". This soft resin contains varying proportions of higher oils, primarily unsaturated hydrocarbon oils of rather high molecular weight and perhaps some unreacted substituted benzene, which are not removed by distillation at temperatures not exceeding 100° C. If a solid or hard resin is desired, the distillation is continued as described above until substantially all of the readily volatile solvents and higher oils have been driven off.

If hard resin, free from the higher oils is desired, the resin may be again placed in a hydrocarbon solvent such as benzol and reprecipitated by alcohol or acetone, the higher oils remaining in solution in the benzol and alcohol mixture. This solution mixture may be separated by decanting the two formed layers, and the precipitate may then be heated under vacuum which drives off all alcohol and benzol, and a clear brittle resin results.

It has been found that where a gas such as carbon dioxide, air, oxygen or the like is passed through the resinous mass, and kept well agitated, the heating jacket may be raised to a higher temperature of the order of 180° C. with a resultant rapid increase of the drying and hardening of the resin without injury to the resin. This may be readily accomplished by supplying oil heated to a temperature of about 180° C. to the external jacket, while a gas is being passed into the well agitated resinous mass. This treatment drives off the remaining solvent and higher oils present in the resin which tend to make it soft. When substantially pure materials are used, this hardening process is materially shortened, due to the fact that the higher oils which tend to make the resin soft are largely formed from impurities present in the starting materials. When it is desired to produce a hard resin having a substantially neutral reaction, a non-oxidizing gas, such as carbon dioxide, may be passed through the heated resinous mass.

By avoiding the use of steam or substantial quantities of water throughout the drying process, the occlusion of water in the resin is avoided and a clear product obtained. But steam distillation may be advantageously used if the occluded H₂O makes no difference in the product, that is, when a clear resin is not desired. Means may be used to free this occluded H₂O from the hardened resin, when it is desired to use a steam distillation in hardening the resin.

The unsaturated hydrocarbon resin produced in this manner is hard, light in color, and clear when the occlusion of water has been avoided, as above described.

The unsaturated hydrocarbon resins produced in this manner have, as a general rule, higher iodine values than other hydrocarbon resins, some of these resins having an iodine number above 75 and as high as 200. This property appears to be indicative of certain valuable characteristics of the resin. For example, it has been found that the reactivity of the resin is in many cases proportional to the iodine number of the resin; that is, a resin having a higher iodine number is usually more reactive than a resin made from starting materials of the same type and having a lower iodine number.

The unsaturated hydrocarbon resin is soluble in petroleum hydrocarbon solvents and is suitable for making coating materials, molding compounds and for other useful purposes. When this resin, in solution in a suitable paint or varnish solvent, such as mineral spirits, is used as a coating material, a film is produced which dries rapidly, is unusually durable, and is substantially water-proof. This film, however, becomes somewhat brittle on drying and does not have the extraordinary flexibility required for certain types of protective coating. The described resin also combines readily with the usual drying oils to make protective coating materials. The product produced by combination with drying oils is superior in certain respects to most coating materials, and the film formed therefrom is superior in certain characteristics, particularly flexibility, to the film formed from the resin alone in a paint or varnish solvent. It has also been found that an excellent coating material can be produced by heating a mixture of the described unsaturated hydrocarbon resin with a drying oil and a non-drying vegetable oil, such as castor oil. The preparation and properties of the above mentioned coating materials are more fully described and claimed in the co-pending applications of Charles A. Thomas and Carroll A. Hochwalt, Serial No. 470,534, filed July 24, 1930, and of Charles A. Thomas and Carroll A. Hochwalt, Serial No. 470,535, filed July 24, 1930.

It has also been found that this described unsaturated hydrocarbon resin has the unusual property, when heated with a non-drying oil, such as castor oil, of reacting with such oil alone to form a new resinous reaction product. Such a reaction product may be made from widely varying proportions of castor oil and resin, the hardness of the product varying with the proportion of oil used. By way of example, when castor oil, which is composed essentially of a glyceride of ricinoleic acid, and the described unsaturated hydrocarbon resin in about equal proportions by weight, are heated together at about 310° C. for about two hours, the mixture reacts to form a new resinous product. The occurrence of a chemical reaction during the heating of the mixture, is indicated by foaming, and the formation and giving off of water as a product of the reaction. The resulting product is also found to have a lower iodine number than the original resin. This reaction product upon cooling, forms a hard resin, soluble in varnish solvents. When a solution of this resin product in a varnish solvent, such as mineral spirits, is brushed on a surface, it dries to form a usable film which is water-proof and quite flexible. The formation of such a reaction product is novel, and one not to be expected, since other known synthetic resins do not react with castor oil, and will not produce with castor oil a product which dries to form a usable film. The film produced from the reaction product of the described resin with castor oil is water-proof and is more flexible than the film produced from the product of the resin with the usual drying oils. It is also more flexible than the film produced from the product of the resin with a mixture of drying oil and non-drying oil.

It has further been discovered that the described unsaturated hydrocarbon resin appears to react with polyhydric alcohols such as ethylene glycol, glycerin and the like, to form a new product. For example, when the described unsaturated hydrocarbon resin is mixed with glycerin in the proportions of about 5 to 40% by weight of glycerin, based on the weight of the resin, and the mixture heated to a reacting temperature, for example about 280° C., a definite reaction appears to take place. The mixture foams and an appreciable amount of water is given off which may be collected. When the resulting reaction product is allowed to cool, it is found to be a hard resin having a lower iodine number than the original resin. When dissolved in a varnish solvent such as mineral spirits, and brushed on a surface, the resin forms a film which does not have the high degree of flexibility required in certain coating materials.

It has been further discovered that the described unsaturated hydrocarbon resin may also be reacted with a combination of a vegetable oil such as castor oil, and a polyhydric alcohol such as glycerin, to produce a still different resinous reaction product, which is very superior, particularly as to flexibility of the film produced therefrom.

It has been found that on heating castor oil alone, a saponification reaction takes place, setting free the castor oil acids. In order to prevent such separation, castor oil may be heated with a polyhydric alcohol, such as glycerin, and the re-esterified product heated with the described unsaturated hydrocarbon resin to form a new resinous product.

The reaction mixture consisting of the re-esterified castor oil, and the described unsaturated hydrocarbon resin may be subjected to further heating with an additional amount of a polyhydric alcohol, such as glycerin. A reaction product may also be produced by heating together a mixture of a polyhydric alcohol, castor oil, and the described unsaturated hydrocarbon resin, but a reaction product so formed is found to have somewhat different properties. Various polyhydric alcohols, such as glycerin, ethylene glycol, and the like, are suitable for carrying on this reaction.

As an example of the production of this new resinous reaction product, the following procedure is described. The reaction is preferably carried on in a vessel made from or lined with material not affected by the reaction. Glass or aluminum vessels have been found satisfactory, and it has usually been found that the use of iron vessels appears to produce a darker colored product. The vessel is also provided with a suitable condenser so that water and other volatile products of the reaction which distil over during the heating processes are removed from the reaction mass, and may be collected. If desired, the material may be agitated throughout the process or at any part thereof, by any suitable mechanical means. 100 parts by weight of blown castor oil are heated in a suitable vessel, such as described, to about 310° C., or until the mass begins to jell or polymerize. The polymerization reaction which takes place during the heating is not entirely understood, but apparently water is split off during the reaction. When the reaction has reached the desired point, as indicated when the material jells, the mass is allowed to cool to about 260° C. About 6 parts by weight of glycerin are then added. The mixture is then heated to about 285° C., or until it begins to thin somewhat. When the mixture has reached a thin or oily consistency, 100 parts by weight of the unsaturated hydrocarbon resin herein before described are added. The exact time at which the resin is to be added must be judged by experiment, and by constant testing of the material so that the point when it begins to thin may be determined. After the addition of the resin, the temperature of the mixture will be somewhat below 285° C., generally between 260 and 285° C., and the reaction mass is held at that temperature until it appears clear,—that is, until a sample dropped on a metal plate, according to the usual practice of varnish makers in testing varnish materials, gives a clear "pill", or drop of material. This heating may require about 1 hour. The mixture is then cooled to about 260° C., and about 3 parts by weight of glycerin are added. The mixture is again heated to about 310° C. and held at that temperature until bodying begins,—that is, until the mixture begins to thicken. The proper degree of bodying is determined by experiment. This may be done by the usual methods employed by varnish makers, and is somewhat dependent on the consistency desired for particular uses. When the desired body has been reached, the mixture is cooled to about 285° C., and at this temperature the desired amount of mineral spirits or other varnish thinner is added, in order to produce a material which when cooled will be of the desired consistency for use as a coating material. During the whole process above described, the volatile constituents are being distilled off, and may be collected and weighed if desired, so that the total weight of the remaining product may be calculated and considered in relation to the amount of thinner to be added. The thinner is preferably added as described at the temperature indicated, because the reaction product dissolves more slowly when cold. On cooling after addition of the thinner, the material is ready for use as a coating material.

The resinous reaction product thus produced, when allowed to harden without solution in a solvent, has the general appearance of synthetic rubber. It is tough and does not become hard at ordinary temperatures. This resinous product is soluble in chloroform, benzol, alcohol, and varnish solvents, such as mineral spirits, solvent naphtha and the like. When dissolved in a varnish solvent, such as solvent naphtha or mineral spirits, a clear solution is formed. When brushed on a surface, this solution leaves a clear yellowish film which dries quickly without the use of a metallic dryer. Films made from this material were subjected to an accelerated aging test by baking at 120° C. for various periods of time. Under such treatment the film stands up remarkably well, and retains its flexibility to a most unusual degree. After such a film on a metal sheet had been subjected to the baking process described for as long as 200 hours, the metal sheet could be bent double several times in succession without cracking or injuring the film. The described film is also substantially waterproof, and very resistant to acids and alkalis, its durability being very satisfactory. Due to the fact that this film is not softened by lacquer, it is particularly suitable for use as an undercoat or prime coat for other coating material. The material is also adapted for use with pigments in the usual manner to make coating materials. Because of its great flexibility and durability the material is of special value for use on surfaces subject to shock or strain. This resinous material is also adapted for use as a molding compound, with or without pigments, filling material and the like.

Reaction products have also been produced by reacting the described unsaturated hydrocarbon resin with various esterified fatty acids of vegetable oils, according to the process described above. For example, the commercial fatty acids of linseed oil or a mixture of commercial fatty acids of linseed oil and commercial fatty acids of China wood oil, may be esterified by reaction with glycerin, and the esterified products reacted with the unsaturated hydrocarbon resin and an additional amount of glycerin, according to the process described, and using the same proportions indicated in the example given. The resulting resinous products when dissolved in a varnish solvent, and brushed on a surface, dry to form films which are quite flexible, but become brittle after baking at 120° C. for 18 hours. These films are not waterproof.

When commercial castor oil acids are reacted with glycerin, and the esterified product reacted with the unsaturated hydrocarbon resin and an additional amount of glycerin, according to the process described above, using the same proportions indicated in the example given, a resinous reaction product is also obtained. This resinous product when dissolved in a varnish solvent and brushed on a surface, dries to form a film which is flexible, but which becomes brittle after baking for 18 hours at 120° C. This film is also not entirely water-proof.

While the methods and processes herein described and the products so produced constitute preferred embodiments of this invention, it is to be understood that the invention is not limited to these precise methods or processes, or precise products, and that changes may be made therein without departing from the scope of the invention which is defined in the appended claims.

Attention is drawn to my co-pending application #31,440 filed July 15, 1935 in which subject matter divided out of the instant application is claimed.

What is claimed is:

1. The resinous reaction product of a preformed unsaturated hydrocarbon resin obtained by the polymerization of a cracked petroleum distillate with a polyhydric alcohol.

2. The resinous reaction product of a polyhydric alcohol with a preformed, substantially neutral, unsaturated hydrocarbon resin formed by polymerizing a diolefine and at least one other hydrocarbon.

3. The resinous reaction product of a polyhydric alcohol and a substantially neutral unsaturated hydrocarbon resin formed by the polymerization of a diolefine with at least one of the following: an olefine and an alkyl benzene.

4. The product as defined in claim 3 and further characterized in that the hydrocarbon resin has been polymerized in the presence of a metallic halide polymerizing agent.

5. The resinous reaction product obtained by heating to reaction temperature a polyhydric alcohol with a substantially neutral, unsaturated hydrocarbon polymer derived by the polymerization of a cracked petroleum distillate rich in diolefines.

6. The product as defined in claim 5 and further characterized in that the unsaturated hydrocarbon polymer has a degree of unsaturation as measured by its iodine value of not substantially less than eighty.

7. The product as defined in claim 5 and further characterized in that the hydrocarbon polymer is prepared by polymerizing a cracked petroleum distillate rich in diolefines in the presence of a metallic halide polymerizing agent.

CHARLES A. THOMAS.